Aug. 7, 1956   W. F. HANNON   2,757,493
CHUCKING MEANS
Filed July 10, 1951
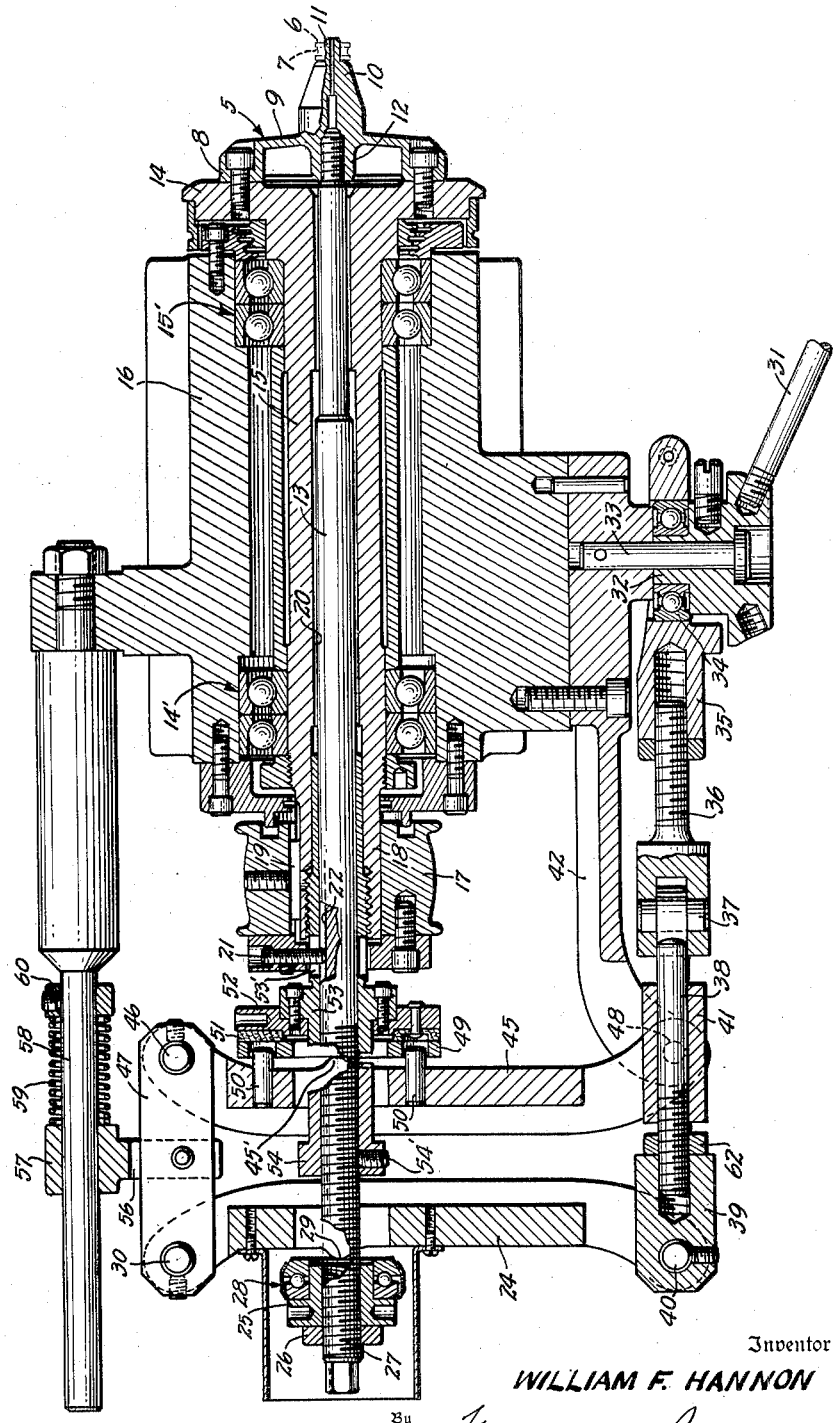
Inventor
WILLIAM F. HANNON
By
Mitchell & Bechert
Attorneys

United States Patent Office 2,757,493
Patented Aug. 7, 1956

2,757,493

CHUCKING MEANS

William F. Hannon, Berlin, Conn., assignor to The Fafnir Bearing Company, New Britain, Conn., a corporation of Connecticut Application July 10, 1951, Serial No. 235,990

2 Claims. (Cl. 51—237)

My invention relates to resilient chucking means, and in particular to improved means for the precision chucking of antifriction bearing rings.

In chucking for precision-grinding operations, and in particular when chucking race rings of antifriction bearings for final race-grinding operations, it is most important that chucking stresses be uniformly applied on the chucked article, and that the magnitude of the applied stress be very carefully regulated. Necessarily, however many jaws are utilized to chuck such rings, there will be a number of discrete points of chucking-stress concentration about the ring, resulting in deviations from truly circular grinding in the finished article. In the past, it has been difficult to avoid overstressing the ring during grinding in order to avoid such deviations. In this connection, serious difficulties have been encountered in wear of the jaws as each ring is mounted and dismounted. The jaws had previously to be designed to anticipate such wear, so that, in the initial period of use of the jaws, a given chucking action produced greater distorting stresses in the race to be ground that the same jaws might later produce, after extended use. To avoid such difficulties, jaws had to be designed and constructed to substantially the size needed for minimum race stressing, so that the lifetime of chuck jaws was relatively short.

It is, accordingly, an object of the invention to provide an improved device of the character indicated.

It is another object to provide a means for substantially prolonging the life of chucking means of the character indicated.

It is a further object to provide adjustably selectable means for compensating for jaw wear in chucking means for precision grinding, so that grinding may be effected within strict tolerance limitations throughout the life of the jaws.

It is a specific object to provide a spindle chuck of the character indicated with automatic independently adjustable braking means for coordinating a braking of the spindle with a given chuck action.

Other objects and various further features of novelty and invention will be pointed out or will become apparent to those skilled in the art from a reading of the following specification. The drawing shows, for illustrative purposes only, a longitudinal sectional view of a preferred form of the invention as embodied in a spindle-mounted chuck.

Briefly stated, my invention contemplates application to resilient-action chucks wherein a plurality of jaws are normally urged in the chucking direction by resilient means. Actuating means are disposed to act against the resilient means to unchuck the jaws, and adjustable abutment means limit spring-urged movement of the actuating member in the chucking direction, whereby the extent to which the jaws will be moved in the chucking direction may be adjustably regulated. In the specific form to be described, the spring means for the jaws is inherent in the action of the diaphragm upon which the jaws are mounted, and a novel actuating mechanism not only provides for adjustment of the limiting chucking displacements of the jaws but also provides independent adjustment for the brake action to be applied to the spindle, in proper coordination with an unchucking actuation of the jaws.

Referring to the drawings, my invention is shown in application to chucking means 5 for antifriction-bearing-ring means, such as an inner bearing ring 6 in which the race groove 7 is to be precision ground. The chucking means 5 may be of the so-called diaphragm type, comprising a mounting rim 8 integral with a relatively thin-section, stiffly resilient diaphragm 9. A plurality of axially projecting angularly spaced jaws 10—11 may be formed integrally with the nose or central portion of the chucking means 5, and in the form shown a threaded boss or hub 12 at the back end of the diaphragm 9 serves for engagement with an actuating member 13. The diaphragm 9 may be normally (that is, in an unstressed condition) slightly forwardly conical, as shown, so that upon a leftward actuation of the member 13 (in the sense of the drawing), the jaws 10—11 may be drawn towards one another, that is, in an unchucking direction. Such actuation will be understood to be against the resilient action of diaphragm 9 so that upon release of the actuating member 13 the jaws 10—11 will be resiliently urged radially outwardly to grip the bore of the work specimen 6.

The chucking means 5 may be revolubly mounted upon the flanged nose 14 of a spindle 15, supported in antifriction bearing means 14'—15' in a frame 16. I show drive means in the form of a pulley 17 supported on the reduced end 18 of spindle 15 and keyed thereto at 19. The actuating member 13 is preferably longitudinally slidable independently of the spindle 15 but rotates therewith. The actuating member 13 may therefore clear the bore or hollow 20 of spindle 15, and a radially projecting set-screw 21 may extend into a keyway 22 in the actuating member 13 to hold the anchorage of member 13 in chuck 5.

Chuck actuation may be effected through a lever on rear spreader arm 24 acting on the rod 13 by way of adjustable means. Thus, one (25) of two lock nuts 25—26 threaded on the rearwardly projecting end of rod 13 may carry thrust-bearing means 28, the free ring of which may be symmetrically engaged by projections, as at 29, on the rear spreader arm 24. The arm 24 may be pivoted at 30 and manually actuable in the axial direction by cranking means such as a handle 31. The cranking means may utilize an eccentric hub 32 pinned at 33 to the frame and spaced by antifriction-bearing means 34 from an eccentrically gyratable ring member 35. A link 36 may be threaded to member 35 and pinned at 37 to connecting rod 38, which in turn is shown to be adjustably threadedly received in a fitting 39 pinned at 40 to the rear spreader arm 24. If desired, the connecting rod 38 may be guided by a sleeve 41 carried on an arm 42 constituting part of the frame 16. In operation, then, the eccentric 32 will be thrown to the left (in the sense of the drawing) to pull rod 13 back for a chuck-opening movement, to the position shown in the drawing; upon movement of handle 31 away from the position shown, the force of abutment 29 on thrust bearing 28 will be relaxed, and chucking may proceed in response to the preloaded resiliency of diaphragm 9.

In accordance with a feature of the invention, I provide adjustable means whereby a fixed limit may be selectably placed on the extent to which the diaphragm 9 will be permitted to open the chuck jaws 11. This fixed abutment may be readily set by manipulation of a stop nut 54 carried on the threaded end part 27 of rod 13. The nut 54 is shown in axial-clearance relation with a part 53 threadedly received in the spindle 15; but it will be understood that, when handle 31 is moved from the position shown, this clearance will be taken up, and nut 54 will be driven against part 53 of the spindle. All thrusts involved in determining the chuck-limiting action are thus solidly based on the spindle 15. The nut 54 may include set-screw means 54' to secure a selected chuck-limiting action; and, as the jaws 11 wear with extended use, the nut 54 provides the only necessary adjustment to maintain substantially uniform, relatively light and non-distorting chucking forces.

In accordance with a further feature of the invention the described adjustably selectable chuck action may be automatically coordinated with an independently adjustable brake action so that, upon unchucking, the spindle may be braked automatically. The brake-actuating member may be a second or forward spreader arm 45 similar to the rear spreader arm 24 and pivotally related thereto, as by means of a pin 46 to a short link 47 connecting members 24 and 45. The other end of the forward spreader arm 45 may be fixedly pivoted to the frame arm 42 at 48. The forward spreader arm 45 may support a brake shoe 49 against rotation, as by means of a plurality of fixed pins 50, and symmetrically spaced projections 45' on arm 45 may axially drive the brake shoe 49, for application of braking effort. The other parts of the braking mechanism may be carried by the spindle 15 and are shown to include friction material 51 supported on a shoe member 52 carried by the spindle part 53. The threaded relation between spindle part 53 and spindle 15 will be seen to permit adjustable axial placement of the rotating brake shoe 52; a given adjustment may be held by the set screw 21, which passes through a locking slot 53' in part 53.

The connecting link 47 common to both spreader arms 24 and 45 may be axially resiliently loaded in the brake-relieving direction, as by pinned connection to a lug 56 on a sleeve 57 guided on a longitudinal rod 58, forming part of the frame 16. A compression spring 59 may resiliently load the link 47, and an adjustable collar 60 may provide selection of loading action.

My device will be better understood from a description of a particular cycle of operation beginning with the relation of parts shown. At the instant depicted in the drawing, the brake is fully applied, and the rear spreader arm 24 is fully urged to the left in the sense of the drawings so as to produce maximum stress in the diaphragm 9 and to retract the jaws 10—11. Under these circumstances, a bearing ring may be readily slipped over or removed from the jaws 10—11. Once the ring 6 has been placed in position, the crank 31 may be operated so as to allow diaphragm 9 to displace rod 13 to the right for a chucking actuation of the jaws 10—11. The extent of such chucking movement will be limited first upon closure of the gap between nut 54 and the spindle part 53. Under these conditions, the spread between arms 24—45 will have been reduced, spring 59 will assure relief of the braking engagement at 49—51, and the spindle will be free to rotate. After completion of the grinding operation, the crank 31 may again be actuated so as to spread the arms 24—45 apart, thus forcing a withdrawal of the actuating rod 13 coincident with an application of the brake.

It will be appreciated that my construction provides independent adjustment of a plurality of functions, thus facilitating adjusted coordination of these functions. In particular, adjustment of the spindle part 53 relatively to the spindle 15, as locked by set screw 21, may provide a selection of the braking action for proper coordination with the chucking function; adjustment of nut 54 determines the limit of chucking action, and the lock nuts 25—26 determine the spreading action and therefore the braking force to be applied when the chuck is opened.

It will be seen that I have described a novel and relatively simple mechanism for effectively prolonging the life of jaws in a spring chuck of the character indicated. As the jaws wear, appropriate adjustment may be made at 54 to assure at all times substantially the same stress action against the supported part of a specimen to be ground. Assurance may thus be had for grinding at all times to the closest possible tolerances throughout a very extended jaw lifetime. Also, the independent brake adjustment makes possible optimum coordination of the braking action with unchucking at all times.

While I have described my invention in detail for the preferred form shown, it will be understood that modifications may be made within the scope of the invention as defined in the appended claims.

I claim:

1. In a device of the character indicated, a rotatable spindle including drive means therefor, chucking means mounted on said spindle and including a plurality of jaws for supporting work to be rotated on said spindle, spring means normally urging said jaws in a chucking direction, actuating means movable relatively to said spindle and actuating said spring means for retracting said jaws against the action of said spring means, limiting-abutment means between the spindle and actuating means and poised to intercept said actuating means in a displacement thereof in the chucking direction, whereby said abutment means may limit the ultimate chucking displacement of said jaws, and braking means for said spindle, said actuating means including means adjustably carried thereby for actuating said braking means to brake said spindle upon an unchucking displacement of said actuating means, said adjustably carried means being adjustable independently of said limiting-abutment means, whereby brake action may be selectively adjusted independently of and therefore with respect to unchucking action, for proper coordination of braking and unchucking during an unchucking displacement of said actuating means.

2. In a device of the character indicated, a revolubly mounted spindle including diaphragm chucking means at one end thereof, said chucking means including a plurality of jaws spaced circumferentially about the spindle axis and movable radially upon axial flexure of the diaphragm of said chucking means, an actuating member movable longitudinally within said spindle and engageable with the axially flexible part of said diaphragm, whereby upon axial movement of said actuating member said jaws may be moved radially, adjustable abutment means between said spindle and actuating member for limiting the axial movement of said actuating member in chucking direction, and means for moving said actuating member in said spindle.

References Cited in the file of this patent

UNITED STATES PATENTS

| | | |
|---|---|---|
| 790,705 | Schrader | May 23, 1905 |
| 1,389,272 | Scaife | Aug. 30, 1921 |
| 1,647,220 | Gallimore | Nov. 1, 1927 |
| 1,827,415 | Bidwell | Oct. 13, 1931 |
| 1,858,693 | Van Norman | May 17, 1932 |
| 2,026,639 | Klay et al. | Jan. 7, 1936 |
| 2,331,111 | Dunn | Oct. 5, 1943 |
| 2,413,068 | Pyne | Dec. 24, 1946 |